United States Patent
Harada et al.

(10) Patent No.: US 6,309,564 B1
(45) Date of Patent: Oct. 30, 2001

(54) OPTICAL FILTER COMPRISING TRANSPARENT SUPPORT AND FILTER LAYER CONTAINING DYE AND BINDER POLYMER

(75) Inventors: Toru Harada; Tsukasa Yamada, both of Minami-ashigara (JP)

(73) Assignee: Fuji Photo Film Co., Ltd., Minami-ashigara (JP)

( * ) Notice: Subject to any disclaimer, the term of this patent is extended or adjusted under 35 U.S.C. 154(b) by 0 days.

(21) Appl. No.: 09/421,534

(22) Filed: Oct. 20, 1999

(30) Foreign Application Priority Data

Oct. 20, 1998 (JP) .................................................. 10-316875

(51) Int. Cl.⁷ ................................. F21V 9/04; H01J 31/00; G02B 5/22; G02B 5/28; B32B 7/02
(52) U.S. Cl. .......................... 252/587; 252/582; 428/212; 359/885; 359/590; 313/478
(58) Field of Search ............................ 428/212; 252/587, 252/582; 359/885, 590; 313/478

(56) References Cited

U.S. PATENT DOCUMENTS

| | | | |
|---|---|---|---|
| 5,271,872 | * 12/1993 | Sallavanti et al. | 252/582 |
| 5,354,514 | * 10/1994 | Satake et al. | 252/587 |
| 5,788,914 | * 8/1998 | Oi et al. | 252/587 |
| 6,157,504 | * 12/2000 | Yamada et al. | 359/885 |

FOREIGN PATENT DOCUMENTS

| | | | |
|---|---|---|---|
| 401109302 | * 4/1989 | (JP) | 252/299.1 |
| 03161394 A2 | * 7/1991 | (JP). | |
| 409277693 | * 10/1997 | (JP). | |
| 410086517 | * 4/1998 | (JP). | |

* cited by examiner

Primary Examiner—Cynthia Harris
Assistant Examiner—Lawrence Ferguson
(74) Attorney, Agent, or Firm—Burns, Doane, Swecker & Mathis, LLP (57) ABSTRACT

An optical filter comprises a transparent and a filter layer. The filter layer contains a dye and a binder polymer. The dye is a cyanine dye represented by the formula (I). The filter layer further contains a specific metal complex.

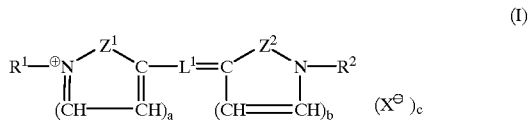

in which each of $Z^1$ and $Z^2$ independently is an non-metallic atomic group forming a five-membered or six-membered nitrogen-containing heterocyclic ring; each of $R^1$ and $R^2$ independently is an alkyl group, an alkenyl group, an aralkyl group or an aryl group; $L^1$ is a methine chain consisting of an odd number of methines; X is an anion; and each of a, b and c independently is 0 or 1.

15 Claims, 1 Drawing Sheet

OPTICAL FILTER COMPRISING TRANSPARENT SUPPORT AND FILTER LAYER CONTAINING DYE AND BINDER POLYMER

FIELD OF THE INVENTION

The present invention relates to an optical filter comprising a transparent support and a filter layer, which has an absorption within a specific wavelength region. In more detail, the invention relates to an optical filter covering a display surface of a display device such as a liquid crystal display device (LCD), a plasma display panel (PDP), an electroluminescence display (ELD), a cathode-ray tube (CRT), a fluorescent indicator tube or a field emission display to improve the color reproducibility of the display.

BACKGROUND OF THE INVENTION

A display device such as a liquid crystal display device (LCD), a plasma display panel (PDP), an electroluminescence display (ELD), a cathode-ray tube (CRT), a fluorescent indicator tube or a field emission display displays a color image with a combination of the three primary colors (i.e., red, blue, green). However, it is very difficult (substantially impossible) to use the ideal three primary colors. For example, the plasma display panel uses phosphors of the three primary colors, which emit light containing an unnecessary component (in the wavelength region of 560 to 620 nm). Therefore, it has been proposed to correct the color balance of the displayed image by an optical filter absorbing the unnecessary component. The optical filter for the color correction is described in Japanese Patent Provisional Publication Nos. 58(1983)-153904, 60(1985)-118748, 60(1985)-18749, 61(1986)-188501, 3(1991)-231988, 5(1993)-203804, 5(1993)-205643, 7(1995)-307133, 9(1997)-145918, 9(1997)-306366 and 10(1998)-26704.

The display device needs prevention of reflection as well as the color collection. On the screen of the display device, the surrounding scene is often reflected to impair the contrast of the displayed image. Various anti-reflection films have been proposed to solve the problem of reflection. The known anti-reflection layers are categorized into two types, namely evaporating (and depositing) layers and coating layers. The evaporating layers are superior to the coating layers in view of optical characteristics, but the coating layers are easily formed compared with the evaporating layers.

The evaporating layers have been used as anti-reflection films for lenses of glasses or cameras. The layers are generally formed by a vacuum deposition process, a spattering method, an ion plating method, a CVD method or a PVD method.

The coating layers can be formed by coating a dispersion of fine particles and a binder. The coating layers are described in Japanese Patent Provisional Publication Nos. 59(1984)-49501, 59(1984)-50401, 60(1985)-59250 and 7(1995)-48527.

The anti-reflection layers can be introduced into the optical filters. The optical filters having the anti-reflection layers are disclosed in Japanese Patent Provisional Publication Nos. 61(1986)-188501, 5(1993)-205643, 9(1996)-145918, 9(1996)-306366 and 10(1997)-26704. The optical filter described in 61(1986)-188501, 5(1993)-205643, 9(1996)-145918 or 9(1996)-306366 has a transparent support containing a dye or a pigment so that the support functions as an optical filter. Further, the optical filter described in 10(1997)-26704 comprises a colored hard coating (surface hardening) layer provided between a support and an anti-reflection layer, so that the hard coating layer functions as an optical filter.

SUMMARY OF THE INVENTION

A colored transparent support or a colored hard coating layer can function as an optical filter. However, it is difficult to incorporate a dye or pigment into the support or the hard coating layer.

The transparent support is made of glass or plastics (usually, plastics). Therefore, the dye or pigment contained in the support must have enough heat resistance to a high temperature in the production process of the support.

The hard coating layer generally comprises a cross-linked polymer. In forming the layer, the polymer is cross-linked after coating a polymer solution. The dye or pigment added in the solution often fades at the cross-linking reaction.

Many cyanine dyes have been researched in the field of silver halide photography. The cyanine dyes have various absorption spectra. The cyanine dyes have been developed to be contained in a photographic material (usually in a gelatin layer). The cyanine dyes contained in the support or the hard coating layer usually have problems such as fading.

On the other hand, various absorption spectra are required for color correction of various display devices. The restricted kinds of dyes or pigments, which can be contained in the support or the hard coating layer, do not satisfy the requirement for color correction.

The applicants have tried to add the cyanine dyes not in the support or the hard coating layer (which restricts the dyes or pigments), but in a polymer layer. The polymer layer can be formed under moderate conditions. Many photographic cyanine dyes can be contained in the polymer layer, which functions as an optical filter. However, the polymer layer does not protect the dyes, compared with the support and the hard coating layer. Therefore, the cyanine dyes to be contained in the polymer layer should be improved in durability (particularly, light resistance).

An object of the present invention is to provide an optical filter improved in not only light resistance as well as color correction performance.

The present invention provides an optical filter which comprises a transparent and a filter layer containing a dye and a binder polymer, wherein the dye is a cyanine dye represented by the formula (I), and the filter layer further contains a metal complex represented by the formula (IIa):

(I)

in which each of $Z^1$ and $Z^2$ independently is an non-metallic atomic group forming a five-membered or six-membered nitrogen-containing heterocyclic ring; each of $R^1$ and $R^2$ independently is an alkyl group, an alkenyl group, an aralkyl group or an aryl group; $L^1$ is a methine chain consisting of an odd number of methines; X is an anion; and each of a, b and c independently is 0 or 1;

(IIa)

in which L is a ligand, M is a metal atom, n1 is an integer of 1 to 10, and m1 is an integer of 1 or 2.

The invention also provides a plasma display panel having a display surface covered with an optical filter which comprises a transparent and a filter layer containing a dye and a binder polymer, wherein the dye is a cyanine dye represented by the formula (I), and the filter layer further contains a metal complex represented by the formula (IIa).

According to the study of the applicants, the metal complex of the formula (IIa) gives light resistance (durability against light) to the cyanine dye of the formula (I) contained in an optical filter, which is continually exposed to strong light. According to the present invention, various known cyanine dyes for photographic materials can be used in the optical filter. The absorption spectra of many cyanine dyes have been well studied in the field of photographic materials. Therefore, the color of the displayed image can be easily corrected by selecting a cyanine dye having an appropriate absorption spectrum.

DETAILED DESCRIPTION OF THE INVENTION

[Layered Structure]

Figure 1:
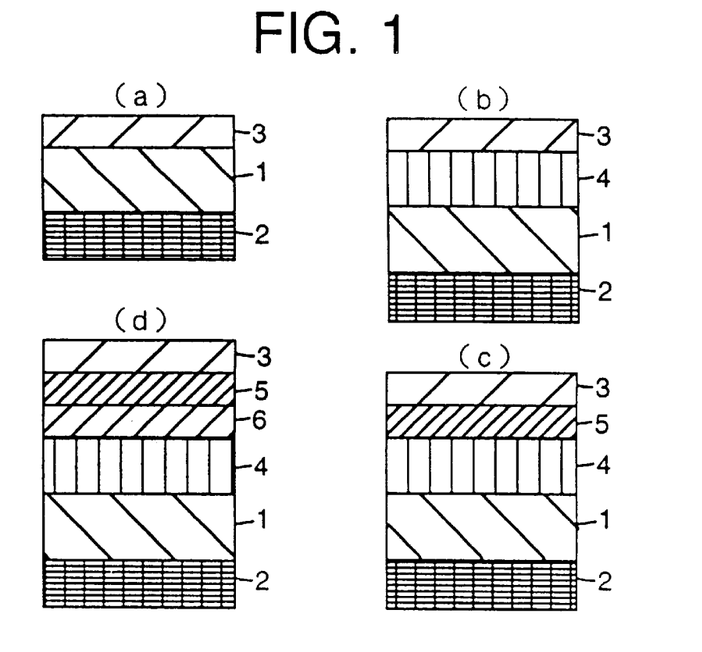
FIG. 1 shows sectional views schematically illustrating an optical filter, which comprises a filter layer, a transparent support and an anti-reflection layer in this order.

FIG. 1 shows sectional views schematically illustrating an optical filter, which comprises a filter layer, a transparent support and an anti-reflection layer in this order.

The embodiment of FIG. 1(a) comprises a filter layer (2), a transparent support (1) and a low refractive index layer (3) in this order. The layer (3) and the support (1) satisfy the condition of $n_3<n_1$ in which $n_3$ and $n_1$ represent the refractive indexes of the layer (3) and the support (1) respectively.

The embodiment of FIG. 1(b) comprises a filter layer (2), a transparent support (1), a hard coating layer (4) and a low refractive index layer (3) in this order.

The embodiment of FIG. 1(c) comprises a filter layer (2), a transparent support (1), a hard coating layer (4), a high refractive index layer (5) and a low refractive index layer (3) in this order. The layers (3) and (5) and the support (1) satisfy the condition of $n_3<n_1<n_5$ in which $n_3$, $n_1$ and $n_5$ represent the refractive indexes of the layer (3), the support (1) and the layer (5) respectively.

The embodiment of FIG. 1(d) comprises a filter layer (2), a transparent support (1), a hard coating layer (4), a middle refractive index layer (6), a high refractive index layer (5) and a low refractive index layer (3) in this order. The layers (3), (5) and (6) and the support (1) satisfy the condition of $n_3<n_1<n_6<n_5$ in which $n_3$, $n_1$, $n_6$ and $n_5$ represent the indexes of the layer (3), the support (1), the layer (6) and the layer (5) respectively.

Figure 2:
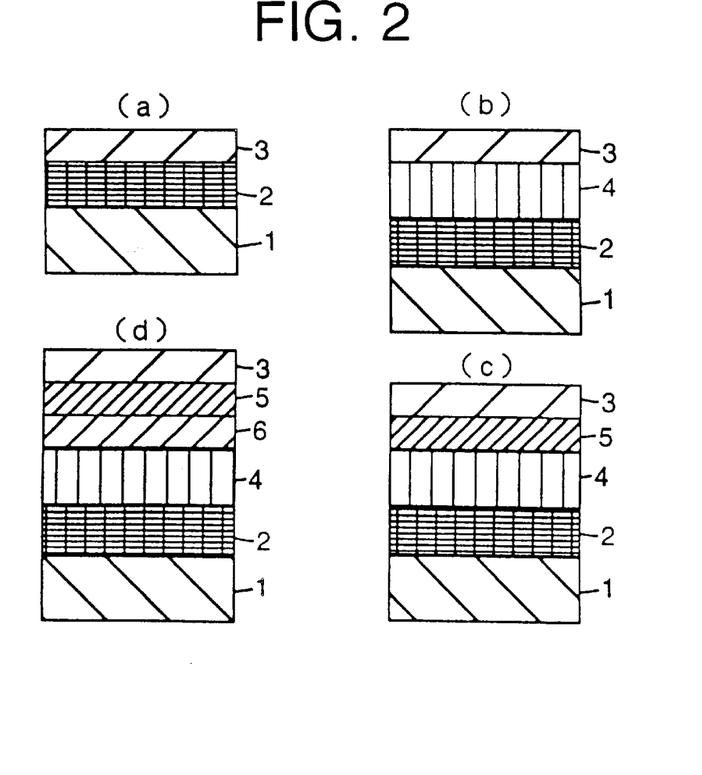
FIG. 2 shows sectional views schematically illustrating another optical filter, which comprises a transparent support, a filter layer and an anti-reflection layer in this order.

FIG. 2 shows sectional views schematically illustrating another optical filter, which comprises a transparent support, a filter layer and an anti-reflection layer in this order.

The embodiment of FIG. 2(a) comprises a transparent support (1), a filter layer (2) and a low refractive index layer (3) in this order. With respect to the refractive index, the layer (3) and the support (1) satisfy the same condition as that of the embodiment of FIG. 1(a).

The embodiment of FIG. 2(b) comprises a transparent support (1), a filter layer (2), a hard coating layer (4) and a low refractive index layer (3) in this order.

The embodiment of FIG. 2(c) comprises a transparent support (1), a filter layer (2), a hard coating layer (4), a high refractive index layer (5) and a low refractive index layer (3) in this order. With respect to the refractive index, the layers (3) and (5) and the support (1) satisfy the same condition as that of the embodiment of FIG. 1(c).

The embodiment of FIG. 2(d) comprises a transparent support (1), a filter layer (2), a hard coating layer (4), a middle refractive index layer (6), a high refractive index layer (5) and a low refractive index layer (3) in this order. With respect to the refractive index, the layers (3), (5) and (6) and the support (1) satisfy the same condition as that of the embodiment of FIG. 1(d).

[Transparent Support]

Examples of the materials for the support include cellulose esters (e.g., diacetyl cellulose, triacetyl cellulose, propionyl cellulose, butyryl cellulose, acetyl propionyl cellulose, nitrocellulose), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrenes (e.g., syndiotactic polystyrene), polyolefins (e.g., polypropylene, polyethylene, polymethylpentene), polymethyl methacrylate, syndiotactic polystyrene, polysulfone, polyethersulfone, polyetherketone, polyether imide and polyoxyethylene. Triacetyl cellulose (TAC), polycarbonates and polyethylene terephthalate are preferred.

The transparent support preferably has a transmittance of more than 80%, and more preferably more than 86%. The haze of the support is preferably in the range of less than 2.0%, and more preferably less than 1.0%. The support preferably has a refractive index of 1.45 to 1.70.

The support may contain IR absorber or UV absorber. The amount of the IR absorber is preferably in the range of 0.01 to 20 wt. %, more preferably 0.05 to 10 wt. %. The support may further contain particles of an inert inorganic compound as a slipping agent. Examples of the inorganic compound include $SiO_2$, $TiO_2$, $BaSO_4$, $CaCO_3$, talc and kaolin.

The support may be subjected to surface treatment. Examples of the surface treatment include chemical treatment, mechanical treatment, corona discharge treatment, flame treatment, UV treatment, high-frequency treatment, glow discharge treatment, active plasma treatment, laser treatment, mixed acid treatment and ozone-oxidation treatment. Preferred treatments are glow discharge treatment, UV treatment, corona discharge treatment and flame treatment. Glow discharge treatment and UV treatment are particularly preferred. For enhancing the adhesion between the support and the layer provided thereon, an undercoating layer may be provided on the support.

[Undercoating Layer]

An undercoating layer is preferably provided between the transparent support and the filter layer. The undercoating layer may contain a polymer having a glass transition temperature of not higher than 60° C. or a polymer compatible with the polymer of the filter layer. On the support surface opposite to the filter layer side, another undercoating layer may be provided to enhance the adhesion between the support and the layers thereon (e.g., anti-reflection layers, hard coating layer). Further, another undercoating layer can be provided to improve the affinity between the optical filter and the adhesive agent for fixing the optical filter onto a display device.

The undercoating layer has a thickness preferably in the range of 2 nm to 20 μm more in the range of 5 nm to 5 μm, further preferably in the range of 20 nm to 1 μm, furthermore preferably in the range of 50 nm to 500 nm, and most preferably in the range of 80 nm to 300 nm.

The undercoating layer containing a polymer having a glass transition temperature of not higher than 60° C. unites the filter layer to the transparent support with the adhesion of the polymer. The glass transition temperature is preferably not higher than 20° C., more preferably not higher than 15° C., further preferably not higher than 10° C., and most preferably not higher than 5° C. The polymer having a glass transition temperature of not higher than 60° C. can be prepared by polymerization or copolymerization of vinyl chloride, vinylidene chloride, vinyl acetate, butadiene, neoprene, styrene, chloroprene, acrylic ester, methacrylic ester, acrylonitrile or methyl vinyl ether.

The undercoating layer having a rough surface also unites the filter layer to the transparent support. On the rough surface of the undercoating layer, the filter layer is provided. The undercoating layer having a rough surface can be easily formed by applying a polymer latex. The polymer latex has a mean particle size preferably in the range of 0.02 to 3 μm, and more preferably in the range of 0.05 to 1 μm.

Examples of the polymer compatible with that of the filter layer include acrylic resins, cellulose derivatives, gelatin, casein, starch, polyvinyl alcohol, soluble nylon and polymer latex.

Two or more undercoating layers can be provided on the support.

The undercoating layer can contain other components such as a solvent for swelling the support, a matting agent, a surface active agent, an antistatic agent, a coating aid and a curing agent.

[Filter Layer]

The filter layer preferably has a thickness preferably in the range of 0.1 μm to 5 cm, more preferably in the range of 0.5 μm to 100 μm, and most preferably in the range of 1 μm to 15 μm. The filter layer preferably gives an absorption spectrum having the maximum in the wavelength region of 560 nm (green) to 620 nm (red) and more preferably in the wavelength region of 560 to 610 nm.

The spectrum preferably has a sharp peak at the absorption maximum. The half-width (width at half of the absorption maximum) of the absorption maximum is preferably in the range of 10 to 200 nm, more preferably 15 to 120 nm, and most preferably 20 to 80 nm.

In the filter layer, the cyanine dye of the formula (I) and the metal complex of the following formula (IIa) are contained in combination.

(I)

In the formula (I), each of $Z^1$ and $Z^2$ independently represents a group of non-metallic atoms forming a five-membered or six-membered nitrogen-containing heterocyclic ring. The nitrogen-containing heterocyclic ring may be condensed with other heterocyclic, aromatic or aliphatic rings. Examples of the nitrogen-containing heterocyclic ring include oxazole ring, isoxazole ring, benzoxazole ring, naphthoxazole ring, thiazole ring, benzothiazole ring, naphthothiazole ring, indolenine ring, benzoindolenine ring, imidazole ring, benzimidazole ring, naphthoimidazole ring, quinoline ring, pyridine ring, pyrrolopyridine ring, furopyrrole ring, indolizine ring, imidazoquinoxaline ring and quinoxaline ring. A five-membered nitrogen-containing heterocyclic ring is preferred to a six-membered ring. A five-membered nitrogen-containing heterocyclic ring is preferably condensed with benzene or naphthalene ring. A particularly preferred ring is imidazoquinoxaline ring.

The nitrogen-containing heterocyclic ring and the ring condensed therewith can have a substituent group. Examples of the substituent groups include an alkyl group (e.g., methyl, ethyl, propyl), an alkoxy group (e.g., methoxy, ethoxy), an aryloxy group (e.g., phenoxy, p-chlorophenoxy), a halogen atom (e.g., Cl, Br, F), an alkoxycarbonyl group (e.g., ethoxycarbonyl), a carbon halide group (e.g., trifluoromethyl), an alkylthio group (e.g., methyl thio, ethylthio, butylthio), an arylthio group (e.g., phenylthio, o-carboxylphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo and carboxyl. Each of sulfo and carboxyl may be in the form of a salt.

In the formula (I), each of $R^1$ and $R^2$ independently represents an alkyl group, an alkenyl group, an aralkyl group or an aryl group.

The alkyl group preferably has 1 to 20 carbon atoms and may have a substituent. Examples of the substituent include a halogen atom (e.g., Cl, Br, F), an alkoxycarbonyl group (e.g., methoxycarbonyl, ethoxycarbonyl), hydroxyl, sulfo and carboxyl. Each of sulfo and carboxyl may be in the form of a salt.

The alkenyl group preferably has 2 to 10 carbon atoms. Examples of the alkenyl group include 2-pentenyl, vinyl, allyl, 2-butenyl, and 1-propenyl. The alkenyl group may have a substituent. Examples of the substituent are the same as those of the alkyl group.

The aralkyl group preferably has 7 to 12 carbon atoms. Examples of the aralkyl group include benzyl and phenethyl. The aralkyl group may have a substituent. Examples of the substituent include an alkyl group (e.g., methyl, ethyl, propyl), an alkoxy group (e.g., methoxy, ethoxy), an aryloxy group (e.g., phenoxy, p-chlorophenoxy), a halogen atom (e.g., Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxylphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo, and carboxyl. Each of sulfo and carboxyl may be in the form of a salt.

Examples of the aryl group include phenyl and naphthyl. The aryl group may have a substituent. Examples of the substituent are the same as those of the aralkyl group.

In the formula (I), $L^1$ is a methine chain consisting of an odd number of methines. The number is preferably 3, 5 or 7. The methine chain may have a substituent. In the case of that, the substituent is preferably placed at the center methine (i.e., meso-position) of the chain. Examples of the substituent include an alkyl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo, and carboxyl. The methine chain preferably has no substituent.

In the formula (I), X represents an anion. Examples of the anion include a halide ion (e.g., Cl$^-$, Br$^-$, I$^-$), p-toluenesulfonate ion, ethylsulfate ion, PF$_6^-$, BF$_4^-$, and ClO$_4^-$. The metal complex represented by the formula (IIa) may serve as the counter ion of the cyanine dye. If so, X is omitted (i.e., c=0).

Each of a, b, and c independently represents an integer of 0 or 1. Each of a and b is preferably 0. In the case where the metal complex of the formula (IIa) functions as the counter ion or in the case where the cyanine dye has an-anionic substituent (e.g., sulfo, carboxyl) to form an inner salt, c is 0.

$$L_{n1}M_{m1} \tag{IIa}$$

In the formula (IIa), L is a ligand. There is no particular restriction on the ligand. The ligand is described in "Yuki-Kinzoku-Kagoubustu (Organometallic Compounds), Goseihoho oyobi Riyoho (Synthesis and Application)" edited by A. Yamada (Tokyo Kagaku Dojin), pp.25.

In the formula (IIa), M is a metal atom. Preferred metals are those of the groups II to IV (more preferably transition metals) in the periodic table. Examples of the transition metal atoms include Cr, Mn, Fe, Co, Ni, Cu, Zn, Pd, Md, and Cd. Particularly preferred metals are Fe, Co, Cu, and Zn.

In the formula (IIa), n1 is an integer of 1 to 10, and m1 is an integer of 1 or 2.

The cyanine dye and the metal complex can form a salt in which the cyanine dye is a cation and the metal complex is an anion.

In the case where the metal complex functions as the counter ion (anion) of the cyanine dye (cation), the complex preferably has the following formula (IIb).

In the formula (IIb), each of $R^{15}$, $R^{16}$, $R^{17}$, and $R^{18}$ independently represents hydrogen atom, an alkyl group, an aryl group or cyano. Otherwise, $R^{15}$ and $R^{16}$ or $R^{17}$ and $R^{18}$ are connected to form an aromatic ring.

The alkyl group preferably has 1 to 20 carbon atoms, and may have a substituent. Examples of the substituent include a halogen atom (e.g., Cl, Br, F), an alkoxycarbonyl group (e.g., methoxycarbonyl, ethoxycarbonyl), hydroxyl, sulfo, and carboxyl. Each of sulfo and carboxyl may be in the form of a salt.

Examples of the aryl group include phenyl and naphthyl. The aryl group may have a substituent. Examples of the substituent include an alkyl group (e.g., methyl, ethyl, propyl), an alkoxy group (e.g., methoxy, ethoxy), an aryloxy group (e.g., phenoxy, p-chlorophenoxy), a halogen atom (e.g., Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxylphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo, and carboxyl. Each of sulfo and carboxyl may be in the form of a salt.

Examples of the aromatic ring formed by $R^{15}$ and $R^{16}$ or $R^{17}$ and $R^{18}$ include benzene ring and naphthalene ring which may have a substituent. Examples of the substituent are the same as those of the aryl group.

In the formula (IIb), each of $Y^1$ and $Y^2$ independently represents O, S or NH (preferably, S), and M represents a metal atom. Examples of the metal atom are the same as those of the formula (IIa).

In the case where the metal complex is added independently of the cyanine dye, the metal complex represented by the following formula (IIc) is preferred.

In the formula (IIc), each of $R^{15}$, $R^{16}$, $R^{17}$, and $R^{18}$ independently represents hydrogen atom, an alkyl group, an aryl group or cyano. Otherwise, $R^{15}$ and $R^{16}$ or $R^{17}$ and $R^{18}$ are connected to form an aromatic ring. Examples of $R^{15}$, $R^{16}$, $R^{17}$, and $R^{18}$ are the same as those of $R^{15}$, $R^{16}$, $R^{17}$, and $R^{18}$ in the formula (IIb), respectively.

Each of $Y^1$ and $Y^2$ independently represents O, S or NH (preferably, S), and M represents a metal atom. Examples of the metal atom are the same as those of the formula (IIa).

In the formula (IIc), "A" represents a quaternary ammonium ion or a quaternary phosphonium ion. Examples of the quaternary ammonium ion include tetramethylammonium, tetraethylammonium, tetrabutylammonium, octyltriethylammonium, phenyltrimethylammonium, triphenylbutylammonium, triphenylbenzylammonium and tetraphenylammonium. Examples of the quaternary phosphonium ion include tetramethylphosphonium, tetraethylphosphonium, tetrabutylphosphonium, octyltriethylphosphonium, phenyltrimethylphosphonium, triphenylbutylphosphonium, triphenylbenzylphosphonium and tetraphenylphosphonium.

In the formula (IIc), n4 is an integer of 0, 1 or 2.

The cyanine dye preferably has the following formula (III).

In the formula (III), each of $R^3$, $R^4$, $R^5$, and $R^6$ independently represents an alkyl group, an alkenyl group, an aralkyl group or an aryl group. Examples of each group are the same as those of $R^1$ and $R^2$ in the formula (I).

Each of $R^7$ and $R^8$ independently represents an alkyl group (e.g., methyl, ethyl, propyl), an alkoxy group (e.g., methoxy, ethoxy), an aryloxy group (e.g., phenoxy, p-chlorophenoxy), a halogen atom (e.g., Cl, Br, F), an alkoxycarbonyl group (e.g., ethoxycarbonyl), a carbon halide group (e.g., trifluoromethyl), an alkylthio group (e.g., methylthio, ethylthio, butylthio), an arylthio group (e.g., phenylthio, o-carboxylphenylthio), cyano, nitro, amino, an alkylamino group (methylamino, ethylamino), an amido group (e.g., acetamido, propionamido), an acyloxy group (e.g., acetoxy, butyryloxy), hydroxyl, sulfo or carboxyl. Each of sulfo and carboxyl may be in the form of a salt.

In the formula (III), $L^2$ is a methine chain consisting of an odd number of methines. The number is preferably 3, 5 or 7 (more preferably, 3). The methine chain may have a substituent. In the case of that, the substituent is preferably placed at the center methine (i.e., meso-position) of the chain. Examples of the substituent are the same as those for the methine chain in the formula (I). The methine chain preferably has no substituent.

Each of m2 and n2 independently represents an integer of 0, 1, 2, 3 or 4.

In the formula (III), X represents an anion. Examples of the anion are the same as those of X in the formula (I).

In the formula (III), "c" represents an integer of 0 or 1.

It is further preferred for the cyanine dye and the metal complex to form the salt represented by the following formula (IV).

(IV)

In the formula (IV), each of $R^9$, $R^{10}$, $R^{11}$, and $R^{12}$ independently represents an alkyl group, an alkenyl group, an aralkyl group or an aryl group. Examples of each group are the same as those of $R^1$ and $R^2$ in the formula (I).

Each of $R^{13}$ and $R^{14}$ independently represents an alkyl group, an alkoxy group, an aryloxy group, a halogen atom, an alkoxycarbonyl group, a carbon halide group, an alkylthio group, an arylthio group, cyano, nitro, amino, an alkylamino group, an amido group, an acyloxy group, hydroxyl, sulfo or carboxyl. Examples of each group are the same as those of $R^7$ and $R^8$ in the formula (III).

In the formula (IV), $L^3$ is a methine chain consisting of an odd number of methines. The number is preferably 3, 5 or 7 (more preferably 3). The methine chain may have a substituent. In the case of that, the substituent is preferably placed at the center methine (i.e., meso-position) of the chain. Examples of the substituent are the same as those for the methine chain in the formula (I). The methine chain preferably has no substituent.

Each of m3 and n3 independently represents an integer of 0, 1, 2, 3 or 4.

Each of $R^{15}$, $R^{16}$, $R^{17}$, and $R^{18}$ independently represents hydrogen atom, an alkyl group, an aryl group or cyano. Otherwise, $R^{15}$ and $R^{16}$ or $R^{17}$ and $R^{18}$ are connected to form an aromatic ring.

Each of $Y^1$ and $Y^2$ independently represents O, S or NH, and M represents a metal atom.

Examples of $R^{15}$, $R^{16}$, $R^{17}$, $R^{18}$, $Y^1$, $Y^2$, and M are the same as those of each in the formula (IIb).

Examples of the cyanine dyes are shown below.

(I-1)

(I-2)

(I-3)

(I-4)

(I-5)

-continued (I-6)

(I-7)

(I-8)  n: 1
(I-9)  n: 2
(I-10) n: 3

Examples of the metal complexes are shown below.

(II-1)–(II-11)

| | | | | |
|---|---|---|---|---|
| (II-1) | R: 4-CH₃ | Y¹: S | Y²: S | M: Ni |
| (II-2) | R: 4-CH₃ | Y¹: S | Y²: S | M: Co |
| (II-3) | R: 4-CH₃ | Y¹: S | Y²: S | M: Cu |
| (II-4) | R: H | Y¹: S | Y²: S | M: Pt |
| (II-5) | R: H | Y¹: S | Y²: S | M: Pd |
| (II-6) | R: 4-t-C₄H₉ | Y¹: S | Y²: S | M: Cu |
| (II-7) | R: 2,3,4-3Cl | Y¹: S | Y²: S | M: Cu |
| (II-8) | R: 2,3,4,5-4Cl | Y¹: S | Y²: S | M: Cu |
| (II-9) | R: H | Y¹: O | Y²: S | M: Cu |
| (II-10) | R: H | Y¹: NH | Y²: S | M: Ni |
| (II-11) | R: H | Y¹: NH | Y²: Se | M: Cu |

(II-12)–(II-17)

| | | |
|---|---|---|
| (II-12) | R: H | M: Ni |
| (II-13) | R: 4-CH₃ | M: Ni |
| (II-14) | R: 4-CH₃ | M: Cu |
| (II-15) | R: 4-CH₃ | M: Co |
| (II-16) | R: 3,4-2(CH₃) | M: Cu |
| (II-17) | R: 4-NO₂ | M: Ni |

(II-18)–(II-22)

| | | |
|---|---|---|
| (II-18) | R: CN | M: Ni |
| (II-19) | R: CN | M: Co |
| (II-20) | R: CN | M: Cu |
| (II-21) | R: phenyl | M: Cu |
| (II-22) | R: CH₃ | M: Cu |

(II-23)–(II-26)

| | | |
|---|---|---|
| (II-23) | R: CH₃ | M: Ni |
| (II-24) | R: CH₃ | M: Co |
| (II-25) | R: CH₃ | M: Cu |
| (II-26) | R: C₂H₅ | M: Cu |

(II-27)–(II-30)

| | | | |
|---|---|---|---|
| (II-27) | R: CH₃ | R': C₁₁H₂₃ | M: Cu |
| (II-28) | R: C₅H₁₁ | R': C₅H₁₁ | M: Cu |
| (II-29) | R: C₅H₁₁ | R': C₅H₁₁ | M: Ni |
| (II-30) | R: C₅H₁₁ | R': C₅H₁₁ | M: Co |

(II-31)–(II-32)

| | |
|---|---|
| (II-31) | n: 1 |
| (II-32) | n: 2 |

(II-33)–(II-35)

| | |
|---|---|
| (II-33) | M: Co |
| (II-34) | M: Cu |
| (II-35) | M: Ca |

Examples of the salts of the cyanine dyes with the metal complexes are shown below.

(V-1)–(V-3)

| | |
|---|---|
| (V-1) | M: Ni |
| (V-2) | M: Co |
| (V-3) | M: Cu |

(V-4)–(V-23)

| | | |
|---|---|---|
| (V-4)  | R: H        | M: Co |
| (V-5)  | R: H        | M: Ni |
| (V-6)  | R: H        | M: Cu |
| (V-7)  | R: $CH_3$   | M: Co |
| (V-8)  | R: $CH_3$   | M: Ni |
| (V-9)  | R: $CH_3$   | M: Cu |
| (V-10) | R: $CH_3$   | M: Zn |
| (V-11) | R: $CH_3$   | M: Fe |
| (V-12) | R: $CH_3$   | M: Mn |
| (V-13) | R: $CH_3$   | M: Mo |
| (V-14) | R: $t\text{-}C_4H_9$ | M: Co |
| (V-15) | R: $t\text{-}C_4H_9$ | M: Ni |
| (V-16) | R: $t\text{-}C_4H_9$ | M: Cu |
| (V-17) | R: $t\text{-}C_4H_9$ | M: Zn |
| (V-18) | R: $t\text{-}C_4H_9$ | M: Fe |
| (V-19) | R: $t\text{-}C_4H_9$ | M: Mn |
| (V-20) | R: $t\text{-}C_4H_9$ | M: Mo |
| (V-21) | R: H        | M: Ba |
| (V-22) | R: H        | M: Al |
| (V-23) | R: H        | M: Sn |

(V-24)–(V-35)

| | | |
|---|---|---|
| (V-24) | R: $CH_3$       | R': H |
| (V-25) | R: $C_2H_5$     | R': H |
| (V-26) | R: $C_8H_{17}$  | R': H |
| (V-27) | R: $C_2H_4COOH$ | R': H |
| (V-28) | R: $C_2H_4OC_2H_5$ | R': H |

| | -continued | |
|---|---|---|
| (V-29) | R: benzyl | R': H |
| (V-30) | R: $C_2H_5$ | R': $CH_3$ |
| (V-31) | R: $C_4H_9$ | R': $CH_3$ |
| (V-32) | R: allyl | R': $CH_3$ |
| (V-33) | R: phenethyl | R': $CH_3$ |
| (V-34) | R: phenyl | R': H |
| (V-35) | R: $C_2H_4OH$ | R': H |

| | | |
|---|---|---|
| (V-36) | R: H | R': Cl |
| (V-37) | R: Cl | R': Cl |
| (V-38) | R: $NO_2$ | R': H |
| (V-39) | R: $NHCH_3$ | R': H |
| (V-40) | R: $NHCOOH_3$ | R': H |

| (V-42) | n: 2 |
|---|---|
| (V-43) | n: 3 |

SYNTHESIS EXAMPLE 1

Synthesis of the Cyanine Dye Salt (V-7)

In 10 ml of chloroform, 0.63 g of 1,1',3,3'-tetraallylimidazo[4,5-b]quinoxalinocarbocyanine chloride was dissolved. To the solution, 0.61 g of bis(1-methyl-3,4-dithiophenolate) cobalt (II) tetra-n-butylammonium was further added. The mixture was allowed to react for 2 hours at the room temperature. To the resultant mixture, 20 ml of methanol was added. The formed crystalline precipitate was filtered off. Thus, the cyanine dye salt (V-7) was synthesized. The yield was 0.6 g, $\lambda_{max}$ was 592.5 nm ($CHCl_3$), and $\epsilon$ was $1.56 \times 10^5$.

The cyanine dye salts (V-8) and (V-9) were also synthesized in the same manner as Synthesis Example 1. The dye salt (V-8) gave $\lambda_{max}$ of 598 nm ($CHCl_3$) and $\epsilon$ of $1.97 \times 10^5$. The dye salt (V-9) gave $\lambda_{max}$ of 581 nm ($CHCl_3$) and $\epsilon$ of $2.74 \times 10^5$.

Other cyanine dyes and salts thereof can also be synthesized in a similar manner. The synthesis of the cyanine dyes is described in U.S. Pat. No. 3,632,808 and Japanese Patent Provisional Publication Nos. 60(1985)-118748 and 60(1985)-118749, and the synthesis of the metal complex is described in Journal of American Chemical Society 88, 43–50 and 4870–4875.

Two or more cyanine dyes or two or more metal complexes can be used in combination.

The filter layer contains the cyanine dye preferably in an amount of 0.01 mg per $m^2$ to 10 g per $m^2$, and more preferably in an amount of 1 mg per $m^2$ to 1 g per $m^2$.

The filter layer contains the metal complex preferably in an amount of 0.01 mg per $m^2$ to 10 g per $m^2$, and more preferably in an amount of 1 mg per $m^2$ to 1 g per $m^2$.

The filter layer can further contain dye having an absorption maximum in the wavelength range of 500 to 550 nm. Examples of the dyes include an oxonol dye, an azo dye, an azomethine dye, an anthraquinone dye, a merocyanine dye, an arylidene dye and a xanthene dye.

The cyanine dye can be used in combination with other dyes such as near IR absorbing dyes. Examples of the near IR absorbing dye include cyanine dyes (described in Japanese Patent Provisional Publication No. 9(1997)-96891), metal chelate dyes, aminium dyes, diimmonium dyes, quinone dyes, squarylium dyes (described in Japanese Patent Provisional publication Nos. 9(1997)-90547, 10(1998)-204310), and various methine dyes. The near IR absorbing dye is described in "Shikizai (Coloring material)", 61[4] 215–226 (1988), and "Kagaku-Kogyo (Chemical Industry)", May(1986), 43–53.

The cyanine dye can be used in the form of solid fine particles, and the fine particles can be prepared by means of known mills. Examples of the mill include ball mill, vibrating mill, planetary ball mill, sand mill, colloid mill, jet mill, and roller mill. A vertical or horizontal dispersing machine (described in Japanese Patent Provisional Publication No. 52(1977)-92716 and International Patent No. 88/074794) is preferred.

The dispersing process can be carried out in the presence of an appropriate solvent (e.g., water, alcohols). In that case, it is preferred to use a dispersing surface active agent. As the surface active agent, an anionic surface active agent (described in Japanese Patent Provisional Publication No. 52(1977)-92716 and International Patent No. 88/074794) is preferably used. If necessary, an anionic polymer or a nonionic or cationic surface active agent may be used.

The powdery fine particles of the dye may be prepared by the steps of dissolving the dye in an appropriate solvent and adding a bad solvent to precipitate the particles. In that case, the aforementioned surface active agents are also employable. The fine particles may be precipitated by adjusting the pH value.

The filter layer further contains a binder polymer. Examples of the polymer include natural polymers (e.g., gelatin, cellulose derivatives, alginic acid), and synthesized polymers (e.g., polymethyl methacrylate, polyvinyl butyral, polyvinyl pyrrolidone, polyvinyl alcohol, polyvinyl chloride, styrene-butadiene copolymer, polystyrene, polycarbonate, water-soluble polyimide). Particularly preferred polymers are hydrophilic ones (e.g., the aforementioned natural polymers, polyvinyl butyral, polyvinyl pyrrolidone, polyvinyl alcohol, water-soluble polyimide).

The filter layer may contain an anti-fading agent, which stabilizes the dye. Examples of the anti-fading agent include hydroquinone derivatives (described in U.S. Pat. Nos. 3,935,016 and 3,982,944), hydroquinone diether derivatives (described in U.S. Pat. No. 4,254,216 and Japanese Patent Provisional Publication No. 55(1980)-21004), phenol derivatives (described in Japanese Patent Provisional Publication No. 54(1979)-145530), spiroindane or methylenedioxybenzene derivatives (described in British Patent Publication Nos. 2,077,455, 2,062,888 and Japanese Patent Provisional Publication No. 61(1986)-90155), chroman, spirochroman or coumaran derivatives (described in U.S. Pat. Nos. 3,432,300, 3,573,050, 3,574,627, 3,764,337 and Japanese Patent Provisional Publication Nos. 52(1977)-152225, 53(1978)-20327, 53(1978)-17729, and 61(1986)-90156), hydroquinone monoether or p-aminophenol derivatives (described in British Patent Publication Nos. 1,347,556, 2,066,975, Japanese Patent Publication No. 54(1979)-12337, and Japanese Patent Provisional Publication No. 55(1980)-6321), and bisphenol derivatives (described in U.S. Pat. No. 3,700,455, and Japanese Patent Publication No. 48(1973)-31625).

[Anti-Reflection Layers]

The optical filter can have an anti-reflection layer. The optical filter having the anti-reflection layer serves as an anti-reflection film. As the anti-reflection layer, a low refractive index layer is essential. The refractive index of the low refractive index layer is lower than that of the support, and is preferably in the range of 1.20 to 1.55 (more preferably, 1.30 to 1.55).

The low refractive index layer preferably has a thickness of 50 to 400 nm, more preferably 50 to 200 nm.

Various kinds of low refractive index layer have been proposed, and are employable for the invention. Examples of them include a layer comprising fluorine-contained polymer of low refractive index (disclosed in Japanese Patent Provisional Publication Nos. 57(1982)-34526, 3(1991)-130103, 6(1994)-115023, 8(1996)-313702, and 7(1995)-168004), a layer formed by sol-gel method (disclosed in Japanese Patent Provisional Publication Nos. 5(1993)-208811, 6(1994)-299091, and 7(1995)-168003), and a layer containing fine particles (disclosed in Japanese Patent Publication No. 60(1985)-59250, and Japanese Patent Provisional Publication Nos. 5(1993)-13021, 6(1994)-56478, 7(1995)-92306, and 9(1997)-288201). The low refractive index layer containing fine particles may further contain micro voids among the particles. The void ratio in that layer is preferably in the range of 3 to 50 vol. %, and more preferably 5 to 35 vol. %.

Besides the low refractive index layer, layers having higher refractive indexes (i.e., middle and high refractive index layers) are preferably provided to reduce the reflection in a wide wavelength region.

The high refractive index layer has a refractive index preferably in the range of 1.65 to 2.40, and more preferably in the range of 1.70 to 2.20. The middle refractive index layer has a refractive index between those of the low and high refractive index layers. The refractive index is preferably in the range of 1.50 to 1.90, and more preferably in the range of 1.55 to 1.70.

Each of the middle and high refractive index layers has a thickness preferably in the range of 5 nm to 100 $\mu$m, more preferably in the range of 10 nm to 10 $\mu$m, and most preferably in the range of 30 nm to 1 $\mu$m. The haze of each layer is preferably in the range of not more than 5%, more preferably not more than 3%, further preferably not more than 1%.

The middle and high refractive index layers can be formed from a binder polymer having a relatively high refractive index. Examples of that binder polymer include polystyrene, styrene copolymer, polycarbonate, melamine resin, phenol resin, epoxy resin, and a polyurethane derived from the reaction between cyclic (alicyclic or aromatic) isocyanate and polyol. Further, other polymers having cyclic (aromatic, heterocyclic or alicyclic) groups and polymers substituted with a halogen atom except fluorine also have high refractive indexes. The polymer may be prepared by polymerization of monomers having double bonds for radical hardening.

For a higher refractive index, inorganic fine particles may be dispersed in the binder polymers. The inorganic fine particles preferably have a refractive index of 1.80 to 2.80. As the materials for the particles, metal oxides and sulfides are preferred. Examples of them include titanium dioxide (rutile, mixed crystal of rutile/anatase, anatase, amorphous structure), tin oxide, indium oxide, zinc oxide, zirconium oxide, and zinc sulfide. Preferred materials are titanium oxide, tin oxide, and zirconium oxide. The inorganic fine particles may contain other elements, as well as those oxides or sulfides of main component. The "main component" here means the component contained in the largest content (wt. %). Examples of the other elements include Ti, Zr, Sn, Sb, Cu, Fe, Mn, Pb, Cd, As, Cr, Hg, Zn, Al, Mg, Si, P, and S.

The middle and high refractive index layers may be formed from liquid or soluble film-formable inorganic materials. Examples of the materials include alkoxides of various elements, salts of organic acids, coordination compounds (e.g., chelate compounds), and active inorganic polymers.

The surface of the anti-reflection layer (i.e., the low refractive index layer) can be made to show anti-glare performance (which prevents the surface from reflecting the surrounding scene by scattering the incident light). For example, the anti-reflection layer may be formed on a finely roughened surface of a transparent film. Otherwise, the surface of the anti-reflection layer may be roughened by means of an embossing roll. The haze of the anti-reflection layer having such surface is generally in the range of 3 to 30%.

[Other Layers]

The optical filter can further comprise a hard coating layer, a slippery layer, an antistatic layer or an intermediate layer.

The hard coating layer preferably contains a cross-linked polymer, and can be formed from acrylic, urethane or epoxy polymer or oligomer (e.g., UV curable resin) or silica material.

On the top surface of the optical filter, a slippery layer may be provided. The slippery layer gives slipperiness to the surface of the optical filter, and improves the scratch resistance of the filter. The slippery layer can be formed from polyorganosiloxane (e.g., silicone oil), a natural wax, a petroleum wax, a metal salt of higher fatty acid, a fluorine lubricant or its derivative. The thickness of the slippery layer is preferably in the range of 2 to 20 nm.

The layers such as the anti-reflection layers (middle, high, and low refractive index layers), the filter layer, the undercoating layer, the hard coating layer, the slippery layer, and other layers can be formed by known coating methods. Examples of the coating method include dip coating, air knife coating, curtain coating, roller coating, wire bar coating, gravure coating, and extrusion coating with a hopper (described in U.S. Pat. No. 2,681,294). Two or more layers may be simultaneously formed by coating. The method for simultaneous coating is described in U.S. Pat. Nos. 2,761,791, 2,941,898, 3,508,947, and 3,526,528; and "Coating Engineering" pp.253, written by Y.Harazaki, published by Asakura Shoten (1973).

[Use of Optical Filter]

The optical filter of the invention can be applied on a display device such as a liquid crystal display (LCD), a plasma display panel (PDP), an electroluminescence display (ELD) or a cathode ray tube display (CRT). In the case that the optical filter has an anti-reflection layers, the optical filter is so arranged on the device that the surface opposite to the low refractive index layer is attached to the display surface. The optical filter of the invention is particularly effective in a plasma display panel (PDP).

A plasma display panel (PDP) comprises gas, glass substrates (front and back glass substrates), electrodes, electrode-lead member, thick film printing member, and phosphor. Each of the glass substrates is equipped with the electrode and an insulating layer. On the back glass substrate, a phosphor layer is further provided. The gas is enclosed between the substrates.

A plasma display panel (PDP) is commercially available, and is described in Japanese Patent Provisional Publication Nos. 5(1993)-205643 and 9(1997)-306366.

In the display device such as the plasma display panel, the display surface is covered with the optical filter. The optical filter can be directly attached on the display surface. In the case that a plate is arranged in front of the display surface, the optical filter can be attached to the front (outside) surface of the front plate or the back (display side) surface of the plate.

EXAMPLE 1

(Preparation of Coating Solution for Filter Layer)

In 80 g of chloroform, 3.0 g of polyvinyl butyral (PVB-3000K, Denki Kagaku Kogyo K.K.) was dissolved. To the solution, 0.12 g of the cyanine dye salt (V-7) was added. The mixture was stirred for 30 minutes, and then filtered through a polypropylene filter (porosity size: 1 μm) to prepare a coating liquid for the filter layer.

(V-7)

(Formation of Undercoating Layer)

Both surfaces of a polyethylene terephthalate film (thickness: 125 μm) were subjected to corona discharge treatment, and latex of styrene-butadiene copolymer was applied on one of the surfaces to form an undercoating layer of 140 nm thickness.

(Formation of Second Undercoating Layer)

On the undercoating layer, an aqueous solution of gelatin containing acetic acid and glutaric aldehyde was applied to form a second undercoating layer of 40 nm thickness.

(Formation of Low Refractive Index Layer)

To 2.50 g of an active fluorocarbon polymer (JN-7219, Nippon Gosei Gomu Co., Ltd.), 1.3 g of t-butanol was added. The mixture was stirred at room temperature for 10 minutes, and then filtered through a polypropylene filter (porosity size: 1 μm) to prepare a coating liquid for the low refractive index layer. The liquid was applied on the support surface opposite to the undercoating layers by means of a bar coater, to form a layer (thickness after drying: 110 nm). The layer was dried and hardened at 120° C. for 30 minutes to form a low refractive index layer.

(Formation of Filter Layer)

The coating solution for the filter layer was coated on the second undercoating layer so that the formed layer might have a thickness of 0.4 μm after drying. The formed layer was dried at 120° C. for 3 minutes to form a filter layer.

Thus, an optical filter was produced.

EXAMPLE 2

The procedure of Example 1 was repeated except that 0.15 g of the cyanine dye salt (V-8) was used in place of 0.12 g of the cyanine dye salt (V-7), to produce an optical filter.

(V-8)

EXAMPLE 3

The procedure of Example 1 was repeated except that 0.13 g of the cyanine dye salt (V-9) was used in place of 0.12 g of the cyanine dye (V-7), to produce an optical filter.

(V-9)

EXAMPLE 4

The procedure of Example 1 was repeated except that 0.09 g of the cyanine dye (I-6) and 0.09 g of the metal complex (II-1) were used in place of 0.12 g of the cyanine dye salt (V-7), to produce an optical filter.

(I-6)

(II-1)

EXAMPLE 5

The procedure of Example 1 was repeated except that 0.09 g of the cyanine dye (I-6) and 0.09 g of the metal complex (II-2) were used in place of 0.12 g of the cyanine dye salt (V-7), to produce an optical filter.

(II-2)

EXAMPLE 6

The procedure of Example 1 was repeated except that 0.09 g of the cyanine dye (I-6) and 0.09 g of the metal complex (II-3) were used in place of 0.12 g of the cyanine dye salt (V-7), to produce an optical filter.

(II-3)

COMPARISON EXAMPLE 1

The procedure of Example 1 was repeated except that 0.09 g of the cyanine dye (I-6) was used in place of 0.12 g of the cyanine dye salt (V-7), to produce an optical filter.

COMPARISON EXAMPLE 2

The procedure of Example 1 was repeated except that 0.12 g of the following comparative dye (a) was used in place of 0.12 g of the cyanine dye salt (V-7), to produce an optical filter.

(a)

COMPARISON EXAMPLE 3

In 80 g of isopropyl alcohol, 3.0 g of partially hydrolyzed polyvinyl acetate was dissolved. To the solution, 0.3 g of a commercially available dye (Hoster Palm Pink E) was added. The mixture was stirred for 30 minutes, and then filtered through a polypropylene filter (porosity size: 1 μm) to prepare a coating liquid for the filter layer.

The procedure of Example 1 was repeated except for using the above-prepared coating liquid, to produce an optical filter.

(Measurement of Absorbance)

The absorption spectrum of each prepared optical filter was measured by means of a spectrophotometer (U-3210, Hitachi Ltd.) by reference to air. From the measured spectrum, $\lambda_{max}$ and the half-width were obtained. The minimum transmittance (i.e., the percent transmission at the absorption maximum peak) of each sample was in the range of 25 to 35%. The results are set forth in Table 1.

(Measurement of Fluorescence)

The fluorescence of each prepared optical film was measured by means of a fluorophotometer (RT-53000PC, Shimadzu Seishkusho Ltd.). The intensity of each fluorescence was shown in Table 1 in a relative value provided that the intensity of Comparison Example 1 was set at 100.

(Test for Light Resistance)

The light resistance of the optical filter was evaluated in the following manner. The surface opposite to the filter layer side was exposed to light (150,000 lux) emitted by a xenon lamp for 200 hours, and the amount of the remaining dye (Dr) was calculated according to the following formula:

$$D_r = 100 \times (100 - T_a)/(100 - T_b)$$

in which $D_r$ represents the amount of the remaining dye; $T_a$ represents the minimum percent transmission after the exposure; and $T_b$ represents the minimum percent transmission before the exposure.

TABLE 1

| Optical filter | Added compound | λmax | Half-width | Fluor-escence | Light resist. |
|---|---|---|---|---|---|
| Ex. 1 | (V-7) | 598 nm | 70 nm | 0 | 93% |
| Ex. 2 | (V-8) | 600 nm | 65 nm | 0 | 95% |
| Ex. 3 | (V-9) | 597 nm | 67 nm | 0 | 94% |
| Ex. 4 | (I-6) + (II-I) | 595 nm | 70 nm | 0 | 93% |
| Ex. 5 | (I-6) + (II-2) | 594 nm | 72 nm | 0 | 93% |
| Ex. 6 | (I-6) + (II-3) | 592 nm | 75 nm | 0 | 94% |
| Comp. 1 | (I-6) | 596 nm | 74 nm | 100 | 0% |
| Comp. 2 | (a) | 572 nm | 70 nm | 60 | 0% |
| Comp. 3 | Palm Pink E | 570 nm | 150 nm | 9 | 98% |

EXAMPLE 7

(Formation of Undercoating Layer)

On one surface of a transparent support, an undercoating layer (a) and a second undercoating layer were formed in the same manner as Example 1.

On the other surface of the support, the latex of vinylidene chloride-acrylic acid-methyl acrylate copolymer was applied to form another undercoating layer (b) of 120 nm thickness.

(Formation of Second Undercoating Layer)

On the undercoating layer (b), an acrylic latex (HA16, Nippon Acryl Co., Ltd.) was applied to form another second undercoating layer (b) of 50 nm thickness.

(Formation of Filter Layer)

On the second undercoating layer (b), a filter layer was formed in the same manner as Example 1.

(Formation of Low Refractive Index Layer)

On the filter layer, a low refractive index layer was formed in the same manner as Example 1. Thus, an optical filter was produced.

The produced optical filter was evaluated in the aforementioned manners, and the satisfying results similar to those of Example 1 were obtained.

EXAMPLE 8

(Evaluation of Optical Filters)

A surface film of a front plate was removed from a commercially available plasma display panel (PDS4202J-H, Fujitsu Limited). In place of the surface film, each of the optical filters prepared in Examples 1 to 7 (the surface opposite to the low refractive index layer) was attached to the front plate by using an adhesive. The contract of the displayed image was measured. As a result a high contrast of 1:15 was obtained. Further, red light was evaluated. As a result, improved red light (pure red) was obtained.

We claim:

1. An optical filter which comprises a transparent support and a filter layer containing a dye and a binder polymer, wherein the dye is a cyanine dye represented by the formula (I), and the filter layer further contains a metal complex represented by the formula (IIa):

in which each of $Z^1$ and $Z^2$ independently is an non-metallic atomic group forming a five-membered or six-membered nitrogen-containing heterocyclic ring; each of $R^1$ and $R^2$ independently is an alkyl group, an alkenyl group, an aralkyl group or an aryl group; $L^1$ is a methine chain consisting of an odd number of methines; X is an anion; and each of a, b and c independently is 0 or 1;

in which L is a ligand, M is a metal atom, n1 is an integer of 1 to 10, and m1 is an integer of 1 or 2.

2. The optical filter as defined in claim 1, wherein the dye is a cyanine dye represented by the formula (III).

in which each of $R^3$, $R^4$, $R^5$, and $R^6$ independently is an alkyl group, an alkenyl group, an aralkyl group or an aryl group; each of $R^7$ and $R^8$ independently is an alkyl group, an alkoxy group, an aryloxy group, a halogen atom, an alkoxycarbonyl group, a carbon halide group, a alkylthio group, an arylthio group, cyano, nitro, amino, an alkylamino group, an amido group, an acyloxy group, hydroxyl, sulfo or carboxyl; $L^2$ is a methine chain consisting of an odd number of methines; each of m2 and n2 independently is an integer of 0, 1, 2, 3 or 4; X represents an anion; and c is 0 or 1.

3. The optical filter as defined in claim 1, wherein the cyanine dye and the metal complex form a salt in which the cyanine dye is a cation and the metal complex is an anion.

4. The optical filter as defined in claim 3, wherein the metal complex is represented by the formula (IIb):

in which each of $R^{15}$, $R^{16}$, $R^{17}$ and $R^{18}$ independently is hydrogen, an alkyl group, an aryl group or cyano; or $R^{15}$ and $R^{16}$, or $R^{17}$ and $R^{18}$ are combined with each other to form an aromatic ring; each of $Y^1$ and $Y^2$ independently is —O—, —S— or —NH—; and M is a metal atom.

5. The optical filter as defined in claim 1, wherein the metal complex is represented by the formula (IIc):

(IIc)

in which each of $R^{15}$, $R^{16}$, $R^{17}$ and $R^{18}$ independently is hydrogen, an alkyl group, an aryl group or cyano; or $R^{15}$ and $R^{16}$ or $R^{17}$ and $R^{18}$ are combined with each other to form an aromatic ring; each of $Y^1$ and $Y^2$ independently is —O—, —S— or —NH—; M is a metal atom; A is a quaternary ammonium ion or a quaternary phosphonium ion; and n4 is an integer of 0, 1 or 2.

6. The optical filter as defined in claim 4, wherein the cyanine dye and the metal complex forms a salt represented by the formula (IV):

(IV)

in which each of $R^9$, $R^{10}$, $R^{11}$, and $R^{12}$ independently is an alkyl group, an alkenyl group, an aralkyl group or an aryl group; each of $R^{13}$ and $R^{14}$ independently is an alkyl group, an alkoxy group, an aryloxy group, a halogen atom, an alkoxycarbonyl group, a carbon halide group, a alkylthio group, an arylthio group, cyano, nitro, amino, an alkylamino group, an amido group, an acyloxy group, hydroxyl, sulfo or carboxyl; $L^3$ is a methine chain consisting of an odd number of methines; each of m3 and n3 independently is an integer of 0, 1, 2, 3 or 4; each of $R^{15}$, $R^{16}$, $R^{17}$ and $R^{18}$ independently is hydrogen atom, an alkyl group, an aryl group or cyano; or $R^{15}$ and $R^{16}$, or $R^{17}$ and $R^{18}$ are combined with each other to form an aromatic ring; each of $Y^1$ and $Y^2$ independently is —O—, —S— or —NH—; and M is a metal atom.

7. The optical filter as defined in claim 6, wherein $L^3$ in the formula (IV) is a methine chain consisting of three methines.

8. The optical filter as defined in claim 1, wherein the filter layer contains the cyanine dye in an amount of 0.01 mg per $m^2$ to 10 g per $m^2$.

9. The optical filter as defined in claim 1, wherein the filter layer contains the metal complex in an amount of 0.01 mg per $m^2$ to 10 g per $m^2$.

10. The optical filter as defined in claim 1, wherein the filter layer has an absorption maximum in the wavelength range of 560 to 620 nm.

11. The optical filter as defined in claim 10, wherein the absorption maximum has a half-width in the range of 10 to 200 nm.

12. The optical filter as defined in claim 1, wherein the optical filter further comprises a low refractive index layer having a refractive index lower than a refractive index of the support.

13. The optical filter as defined in claim 12, wherein the optical filter comprises the filter layer, the transparent support and the low refractive index layer in this order.

14. The optical filter as defined in claim 12, wherein the optical filter comprises the transparent support, the filter layer and the low refractive index layer in this order.

15. A plasma display panel having a display surface covered with an optical filter which comprises a transparent support and a filter layer containing a dye and a binder polymer, wherein the dye is a cyanine dye represented by the formula (I), and the filter layer further contains a metal complex represented by the formula (IIa):

(I)

in which each of $Z^1$ and $Z^2$ independently is an non-metallic atomic group forming a five-membered or six-membered nitrogen-containing heterocyclic ring; each of $R^1$ and $R^2$ independently is an alkyl group, an alkenyl group, an aralkyl group or an aryl group; $L^1$ is a methine chain consisting of an odd number of methines; X is an anion; and each of a, b and c independently is 0 or 1;

(IIa)

in which L is a ligand, M is a metal atom, n1 is an integer of 1 to 10, and m1 is an integer of 1 or 2.

* * * * *